(12) United States Patent
Lopez-Diaz et al.

(10) Patent No.: US 8,716,971 B2
(45) Date of Patent: May 6, 2014

(54) CIRCUIT AND METHOD FOR SPEED MONITORING OF AN ELECTRIC MOTOR

(75) Inventors: Daniel Lopez-Diaz, Bad Schoenborn (DE); Hans Gommeringer, Hallbergmoos (DE)

(73) Assignee: Freescale Semiconductor, Inc., Austin, TX (US)

( * ) Notice: Subject to any disclaimer, the term of this patent is extended or adjusted under 35 U.S.C. 154(b) by 342 days.

(21) Appl. No.: 13/133,168

(22) PCT Filed: Jan. 5, 2009

(86) PCT No.: PCT/IB2009/050008
§ 371 (c)(1),
(2), (4) Date: Jun. 7, 2011

(87) PCT Pub. No.: WO2010/076665
PCT Pub. Date: Jul. 8, 2010

(65) Prior Publication Data
US 2011/0248660 A1  Oct. 13, 2011

(51) Int. Cl.
*H02P 8/34* (2006.01)
(52) U.S. Cl.
USPC ........... 318/565; 318/519; 318/599; 318/490; 388/909
(58) Field of Classification Search
USPC ......... 318/461, 490, 519, 565, 599, 603, 685, 318/696; 388/909
See application file for complete search history.

(56) References Cited

U.S. PATENT DOCUMENTS

| | | | | |
|---|---|---|---|---|
| 3,523,231 A | * | 8/1970 | Arthur et al. | 318/608 |
| 3,646,309 A | * | 2/1972 | Smith, Jr. et al. | 219/124.34 |
| 4,772,840 A | * | 9/1988 | Taghezout | 318/696 |
| 4,851,755 A | * | 7/1989 | Fincher | 318/696 |
| 5,206,571 A | | 4/1993 | Burri | |
| 5,485,070 A | | 1/1996 | Tominaga | |
| 6,078,154 A | * | 6/2000 | Manlove et al. | 318/293 |
| 6,137,248 A | | 10/2000 | Kalpathi | |
| 6,797,972 B2 | | 9/2004 | Kamoshida et al. | |
| 6,861,817 B2 | | 3/2005 | Pigott et al. | |
| 2005/0140327 A1 | | 6/2005 | Carolan | |

FOREIGN PATENT DOCUMENTS

| | | |
|---|---|---|
| EP | 0119097 A | 9/1984 |
| EP | 0848259 A1 | 6/1998 |
| JP | 02079798 A | 3/1990 |
| JP | 02250691 A | 10/1990 |
| JP | 09163795 A | 6/1997 |
| JP | 11164595 A | 6/1999 |
| JP | 2003348872 A | 12/2003 |

OTHER PUBLICATIONS

International Search Report and Written Opinion correlating to PCT/IB2009/050008 dated Nov. 24, 2009.

* cited by examiner

*Primary Examiner* — Bentsu Ro (57) ABSTRACT

A circuit for speed monitoring of an electric motor comprises a circuit for generating a time-frame signal, a circuit for receiving a first signal from a chopper driver circuit designed to drive the electric motor, a circuit for detecting chopper pulses in the first signal, a pulse counter, and a circuit for at least one of outputting and evaluating a state of the pulse counter, after the inactive state of the time-frame has been indicated. The time-frame signal indicates when a time-frame of predefined length changes from an inactive state to an active state and indicates when the time-frame changes back from the active state to the inactive state. The pulse counter is designed to count the detected chopper pulses while the active state is indicated by the circuit for generating the time-frame signal.

20 Claims, 6 Drawing Sheets

CIRCUIT AND METHOD FOR SPEED MONITORING OF AN ELECTRIC MOTOR

FIELD OF THE INVENTION

This invention in general relates to two circuits for speed monitoring of an electric motor. Further, the invention relates to two methods for speed monitoring of an electric motor.

BACKGROUND OF THE INVENTION

Electric motors and in particular stepper motors can be driven by a chopper control. A chopper control can be recommendable for high power motors, because of its high efficiency. Velocity measurement can be used to detect a stalled or blocked motor.

SUMMARY OF THE INVENTION

The present invention provides circuits and methods for speed monitoring of an electric motor as described in the accompanying claims. Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

Figure 1:
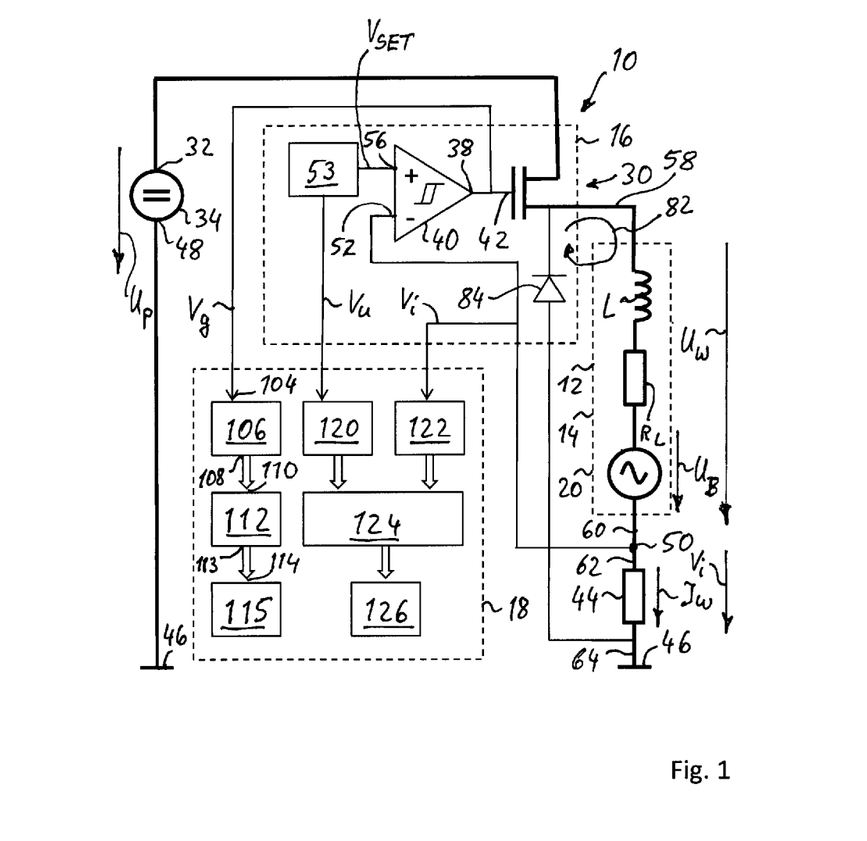
FIG. 1 shows schematically an electric motor, a chopper control circuit to drive the electric motor, and an example embodiment of a speed monitoring circuit.
Figure 2:
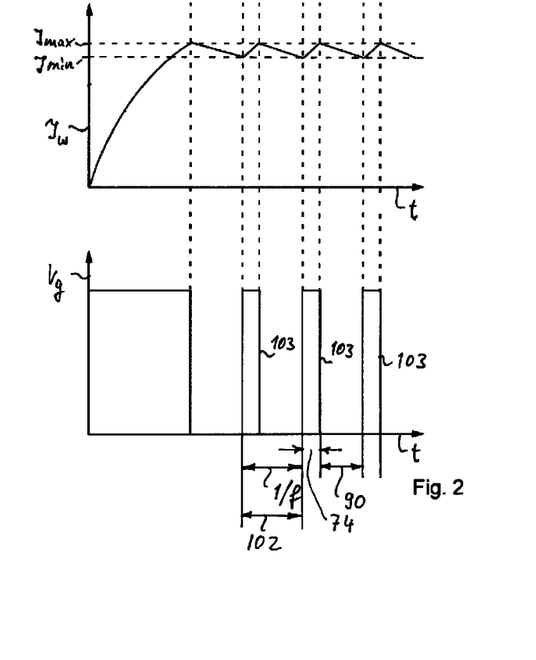
FIG. 2 shows schematically in the lower part an example embodiment of a gate voltage over time of a chopper switch of the chopper control circuit of FIG. 1, and in the upper part of the figure an example embodiment of a corresponding winding current (coil current) over time through the electric motor driven by the chopper control circuit.
Figure 3:
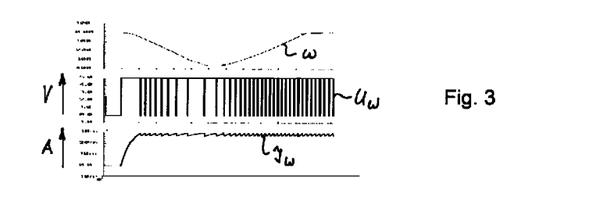
FIG. 3 shows for an example embodiment simulation results of a velocity of the motor during a single step of the motor over time, of the gate voltage over time, and of the winding current through the motor over time, wherein the motor is operating with a normal speed.
Figure 4:
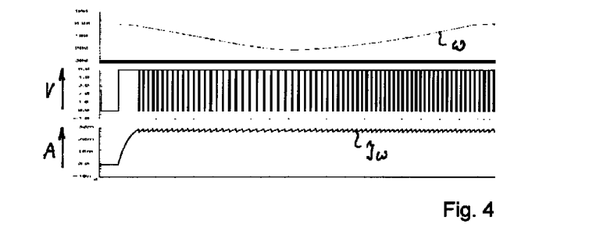
FIG. 4 shows for an example embodiment simulation results of a velocity of the motor over time, of the gate voltage over time, and of the winding current through the motor over time, wherein the motor is operating with a low speed.
Figure 5:
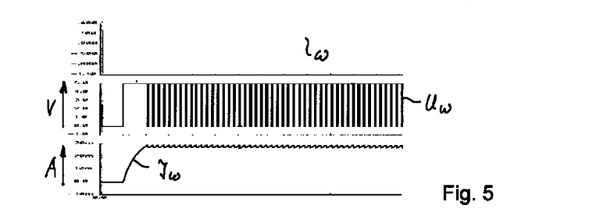
FIG. 5 shows for an example embodiment simulation results of a velocity of the motor over time, of the gate voltage over time, and of the winding current through the motor over time, wherein the motor is stalled/blocked.
Figure 6:
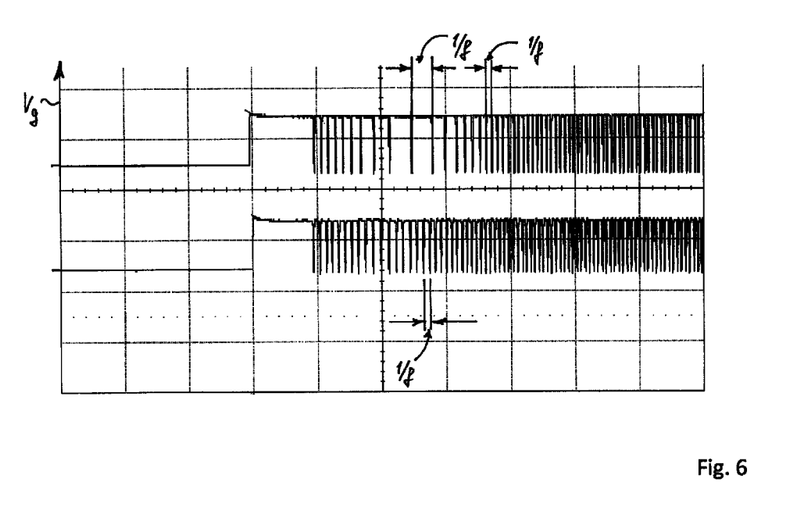
FIG. 6 shows schematically for an example embodiment measurement results of the gate voltage over time for a free running motor (upper part of the figure) and for a stalled/blocked motor (lower part of the figure).
Figure 7:
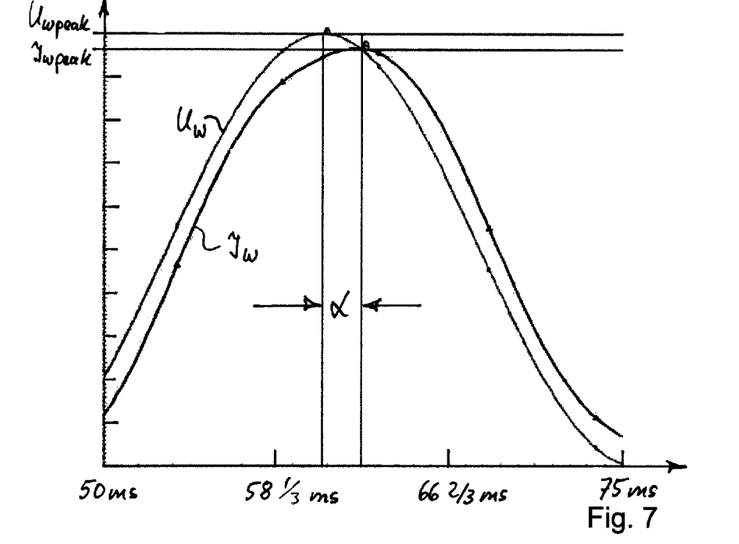
FIG. 7 shows for an example embodiment of a free running motor simulation results of a voltage applied to the winding (coil) of the motor in relation to the resulting winding current.
Figure 8:
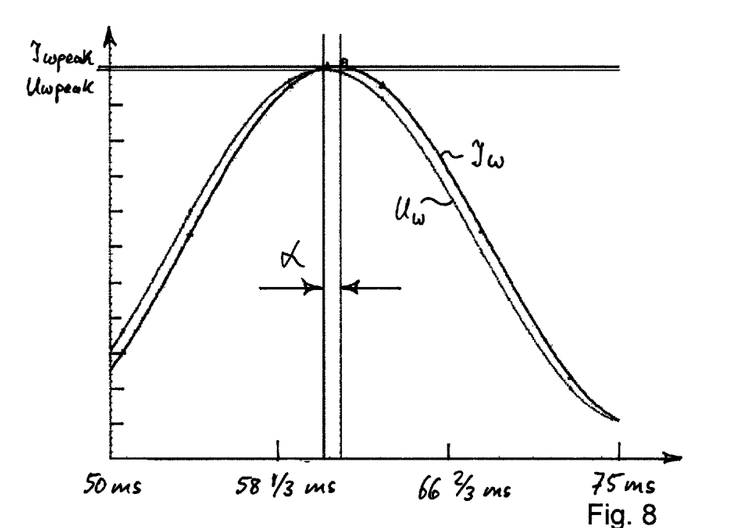
FIG. 8 shows schematically for an example embodiment for a stalled/blocked motor simulation results of a voltage applied to the winding of the motor in relation to the resulting winding current.
Figure 9:
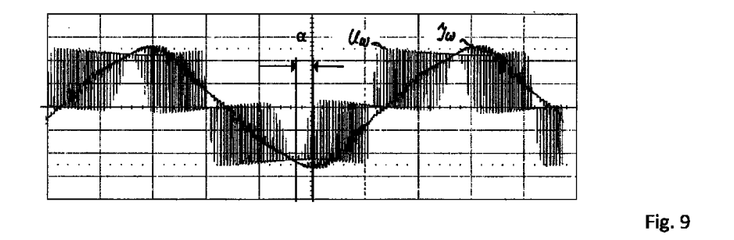
FIG. 9 shows for an example embodiment measured winding currents and voltages over time for a free running motor.
Figure 10:
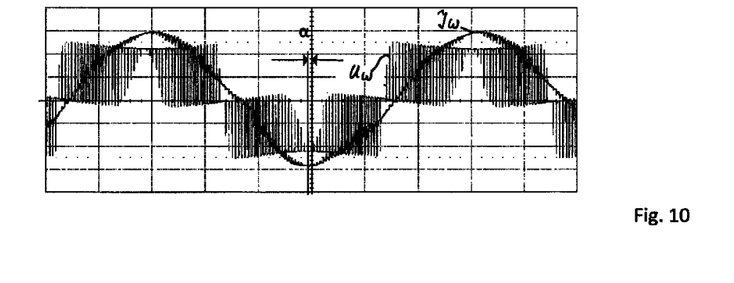
FIG. 10 shows for an example embodiment measured winding currents and voltages over time for a stalled/blocked motor.

FIG. 1 shows schematically a circuit arrangement 10 comprising a winding 12 of an electric motor 14, a chopper control circuit 16 to drive the electric motor 14, and an example embodiment of a speed monitoring circuit 18. The electric behaviour of the winding 12 of the electric motor 14 may be described by an equivalent circuit 20 consisting of a resistance $R_L$, an inductor L, and a voltage source $U_B$ connected in series. The current $I_w$ through the motor winding 12 is supplied via a chopper switch 30 from one pole 32 of a DC voltage supply 34. The DC voltage supply 34 provides a power supply voltage $U_P$. Within the embodiment shown in the figure the chopper switch 30 is a MOSFET (metal-oxide-semiconductor field-effect transistor). The opened-state respectively closed-state of the MOSFET 30 is controlled by an output 38 of a Schmitt-Trigger 40, wherein the output 38 is connected to a gate 42 of the MOSFET 30. Current $I_w$ led through the winding 12 is guided via a measuring resistor 44 to a mass 46. The mass 46 is connected to a second pole 48 of the DC voltage supply 34. A tap 50 between the motor winding 12 and the measuring resistor 44 is connected to an inverting input 52 of the Schmitt-Trigger 40. Thus, the voltage drop $V_i$ at the measuring resistor 44 is applied to the inverting input 52 of the Schmitt-Trigger 40. A speed controller 53 applies a control voltage $V_{set}$ to the non-inverting input 56 of the Schmitt-Trigger 40, wherein the height of the control voltage $V_{set}$ is a value for controlling a desired current of the motor 14.

At start-up no current $I_w$ is flowing through the motor winding 12 and thus neither through the measuring resistor 44. Therefore, at start-up the inverting input 52 of the Schmitt-Trigger 40 has a potential of 0 Volt, while the control voltage $V_{set}$ at the non-inverting input 56 of the Schmitt-Trigger 40 is higher. Thus, the output 38 of the Schmitt-Trigger 40 provides a positive voltage $V_g$ to the gate 42 of the MOSFET 30. Then, the MOSFET 30 activates its source-drain channel and causes current $I_w$ to flow through the motor winding 12 and through the measuring resistor 44. In the following, this mode of operation is called "boost mode". Because of the inductive behaviour of the motor winding 12 (i.e. the inductor L within the equivalent circuit 20), the current $I_w$ through the motor winding 12 does not increase suddenly, but ramp-like. The ohmic resistances of the motor winding 12, of the measuring resistor 44, of the chopper switch 30, and of the electric lines 58, 60, 62, 64 are disregarded for following rough estimations. The slew rate $dI_w/dt$ of the winding current $I_w$ can be calculated by $dI_w/dt=(U_P-U_B-I_w*R_L)/L$ (Equation 1). $U_B$ designates the back electromotive force BEMF and $R_L$ represents a series winding resistance. The BEMF is a voltage $V_B$ which is proportional to a velocity $\omega$ of a motor rotation. When the motor 14 is stalled the BEMF $V_B$ is 0 Volt. In a rotating motor 14 the BEMF $V_B$ is opposing the driving voltage $U_W$. In the boost mode the BEMF $V_B$ is reducing the slew rate $dI_w/dt$. Consequently, same applies to the velocity $\omega$ of the motor rotation. During the boost mode, the highest slew rate $dI_w/dt$ is provided when the motor 14 is stalled. With higher velocity $\omega$ of the motor rotation the slew rate $dI_w/dt$ is decreased more and more by the increased BEMF $V_B$. As Equation 1 shows, this dependency between slew rate $dI_w/dt$ and velocity $\omega$ of the motor rotation is linear but not proportional. The current $I_w$ through the motor winding 12 causes a voltage drop $V_i$ at the measuring resistor 44 and simultaneously increases the potential at the inverting input 52 of the Schmitt-Trigger 40. Finally, the voltage drop 68 applied to the inverting input 52 gets higher than the control voltage $V_{set}$ at the non-inverting input 56 plus a hysteresis amount of the Schmitt-Trigger 40. The value $V_i$ of current $I_w$ through the motor winding 12 reached at this time is called $I_{MAX}$. When the potential at the inverting input 52 gets higher than the control voltage $V_{set}$ plus the hysteresis amount of the Schmitt-Trigger 40, the Schmitt-Trigger 40 changes its state and outputs a low voltage $V_g$ to the gate 42 of the MOSFET 30. Then, the MOSFET 30 deactivates its source-drain channel and then no current $I_w$ is flowing any longer through the MOSFET 30. Following equation 1, the length of the boost period 74 depends on the hysteresis amount of the hysteresis curve of the Schmitt-Trigger 40, on the value of the inductor L of the equivalent circuit 20 of the motor winding 12, on the velocity $\omega$ of the motor rotation, and on the value of the voltage $U_p$ of the power supply 34. In practice, the length of the boost period 74 may be influenced in addition by the value of an internal resistance of the chopper switch 30 and electric lines 58, 60, 62, and 64.

In the following, the operation with the deactivated MOSFET 30 is called "free-wheeling mode". As the equivalent circuit 20 of the motor winding 12 comprises an inductor L, the energy of the magnetic field built-up in the inductor L causes the current $I_w$ to continue, which has been flowing through the winding 12. To facilitate a well-organized continuation of the current flow $I_w$ through the motor winding 12 and other parts 58, 60, 62, 64 of the circuit arrangement 10, a free-wheeling diode 84 is provided. The free-wheeling current circle 82 through the motor winding 12, the measuring resistor 44, the free-wheeling diode 84, and back to the motor winding 12 has no external power supply, because of the deactivated MOSFET 30. Therefore, in the free-wheeling mode the slew rate $dI_w/dt$ of the winding current $I_w$ may be calculated by $dI_w/dt=-(U_B+R_L*I_w)/L$ (Equation 2). When the motor 14 is stalled the BEMF $V_B$ is 0 Volt, and the slew rate $dI_w/dt$ of the winding current $I_w$ is determined by the time constant of the free-wheeling current circle 82. If there was no ohmic loss in the in the free-wheeling current circle 82, the slew rate $dI_w/dt$ of the winding current $I_w$ would be Zero. In the free-wheeling mode the energy from the inductor L is being dissipated with passing time in the resistance $R_L$ of the motor winding 12, of the measuring resistor 44, and other components 58, 60, 62, 64 of the free-wheeling current circle 82. In the free-wheeling mode the BEMF $V_B$ is increasing the negative slew rate $dI_w/dt$. During the free-wheeling mode, the lowest absolute value of the negative slew rate $dI_w/dt$ is provided when the motor 14 is stalled. With higher velocity $\omega$ of the motor rotation the slew rate $dI_w/dt$ of the free-wheeling mode is increased more and more by the increased BEMF $V_B$. As above Equation 2 shows, this dependency between slew rate $dI_w/dt$ and velocity $\omega$ of the motor rotation is proportional. From the decrease of the free-wheeling current $I_w$ results a decrease of the voltage drop $V_i$ at the measuring resistor 44 and a decrease of the potential of the inverting input 52 of the Schmitt-Trigger 40. As soon as the voltage $V_S$ at the inverting input 52 is lower than the control voltage $V_{set}$ minus the hysteresis amount of the Schmitt-Trigger 40, the Schmitt-Trigger 40 switches back to the boost mode. The value of the current $I_w$ through the motor winding 12 reached at this time is called $I_{MIN}$. When the potential $V_i$ of the inverting input 52 gets lower than the control voltage $V_{set}$ plus the hysteresis amount of the Schmitt-Trigger 40, the output 38 of the Schmitt-Trigger 40 activates the MOSFET 30. From thereon, the described procedure is repeated. In the chopper-controlled motor 14, the current $I_w$ is alternating between the two levels $I_{max}$ and $I_{min}$. The length of the free-wheeling period 90 depends on the hysteresis amount of the hysteresis curve of the Schmitt-Trigger 40, on the value of the inductor L of the equivalent circuit 20 of the motor winding 12, on the velocity $\omega$ of the motor rotation, and on the value of the sum of the ohmic resistances in the free-wheeling current circle 82. Summarized, in a rotating motor the BEMF $V_B$ is opposing the driving voltage $U_W$ and increases the current rise time 74 and reduced the current fall time 90 of the current $I_w$. This impacts the rise slew rate $dI_w/dt$, the fall slew rate $dI_w/dt$, a chopper frequency f, a length 1/f of the chopper duty cycle 102, and the chopper duty rate g. In principle, each of these values can be used in a speed monitoring circuit 18 to measure the velocity $\omega$ and hence a stalling of the motor 14. In practice it is most suitable to measure the value of one of the chopping frequency f, the length 1/f of the chopper duty cycle, or the chopper duty rate g=(current rise time 74)/((current rise time 74)+(current fall time 90)). Following equations 1 and 2, with $U_p > U_B$ the chopper duty rate g ($I_w$) can be calculated as: $g=|1/U_p-U_B-R_L*I_w|/(|1/(U_P-U_B-R_L*I_w)|+|-1/(U_B-R_L*I_w)|)=(U_B+R_L*I_w)/U_P$ (Equation 3). Under the assumption that $U_p$ is kept constant, $U_B(I_w)/U_p=g-(R_L*I_w)/U_p$ is a measure for the velocity $\omega$ of the motor 14. Using the chopper duty rate g for the velocity measurement has the benefit that no knowledge about the value of the inductor L is required.

An input 104 of the speed monitoring circuit 18 is connected to the output 38 of the Schmitt-Trigger 40 and senses the gate voltage $V_g$ of the chopper switch 30. The speed monitoring circuit 18 comprises a pulse detector 106 and a pulse counter 112. The pulse counter 112 has an output 113 to convey a counting result to an input 114 of a comparator 115. The comparator 115 is designed for comparing the counting result with a limit value and to derive from the comparison result an estimation of the current motor speed $\omega$. The circuit 18 for speed monitoring of an electric motor 14 comprises: a circuit 106 for generating a time-frame signal, which indicates when a time-frame of predefined length changes from an inactive state to an active state, and which indicates when the time-frame changes back from the active state to the inactive state; a circuit 106 for receiving a first signal $V_g$ from a chopper driver circuit 16 designed to drive the electric motor 14; a circuit 106 for detecting chopper pulses 103 in the first signal $V_g$; a pulse counter 112 designed to count the detected chopper pulses 103 while the active state is indicated by the circuit 106 for generating the time-frame signal; and a circuit 115 for at least one of outputting and evaluating a state of the pulse counter 112, after the inactive state of the time-frame has been indicated. The pulse counter 112 is designed to be reset, when the time-frame signal indicates a change to the active state of the time-frame. The pulse counter 112 is designed to stop a counting of the chopper pulses 103, when the time-frame signal indicates a change into the inactive state. The circuit 18 for speed monitoring comprises a circuit 112 for determining a frequency of the chopper pulses 103. Alternatively or in addition, the circuit 18 for speed monitoring comprises a circuit 112 for determining a length 1/f of a period of a chopper duty cycle 102 of the chopper pulses 103. Alternatively or in addition, the circuit 18 for speed monitoring comprises a circuit 112 for determining a chopper duty rate g of the chopper pulses 103.

According to a second aspect of the invention, a phase shift $\alpha$ is measured when the winding voltage $U_W$ (coil voltage) is generated by pulse-width modulation (PWM). The magnitude of the driving voltage $U_W$ is known at all times because the PWM duty cycle is software-controlled by the current controller 53. The phase shift α can be determined by measuring a delay α between zero crossings of the winding voltage $U_W$ and the winding current $I_w$, or by measuring a delay between a peak winding voltage $U_{wpeak}$ and a peak winding current $I_{wpeak}$. The value of the peak voltage $U_{wpeak}$ is notified by the second signal $V_u$ and the value of the current $I_{wpeak}$ flowing through the winding 12 is notified by $V_i$. The moving rotor of the electric machine 14 increases the phase shift a between the driving current $I_w$ and driving voltage $U_W$ in micro-step operation. This additional shift a of a moving motor 14 is caused by the inertia and the slip of the rotor. Due to its inertia, the rotor is lagging behind the electromagnetic field in the windings L for a given velocity ω. The BEMF $V_B$ is induced by the moving rotor and is therefore also delayed compared to the driving voltage $U_w$. The delay adds an additional phase shift a when the rotor is moving. In case of a stalled motor 14, there is no BEMF $V_B$ signal and the phase shift α is significantly lower than with the rotating motor 14. The circuit 18 for speed monitoring of an electric motor 14 comprises: a circuit 120 for receiving a second signal $V_u$ from a chopper driver circuit 16 for the electric motor 14, wherein the second signal $V_u$ includes a value of a voltage $U_W$ applied to a winding 12 of the electric motor 14; a circuit 122 for receiving a value $V_i$ of an electric current $I_w$ flowing through the winding 12; a circuit 124 for determining a phase angle α between the voltage $U_W$ applied to the winding 12 and the electric current $I_w$ flowing through the winding 12; and a circuit 126 for at least one of outputting and evaluating the phase angle α. An example embodiment of the circuit 18 has all features according to both of the first and second aspect.

Within the described embodiments at least one of a chopper frequency, a length 1/f of a chopper duty cycle 102, a chopper duty rate g, and a phase shift a between the winding voltage $U_W$ and the winding current $I_w$ is measured and analyzed, in order to gain information about the angular velocity ω of the motor 14. With the embodiments the chopper frequency f respectively length 1/f of a chopper duty cycle, respectively a chopper duty rate g, respectively a phase shift a can be measured continuously. Thereby, velocity measurement of those electric motors 14 is performable, which are driven by a chopper control or a pulse-width modulated voltage $U_W$ across the motor windings 12. This applies in particular to stepper motors 14, in particular DC stepper motors 14. In particular not only a rise time 74 is measured when the current $I_w$ is commutated. The embodiments can be used for micro-step operation. The speed monitoring circuit 18, respectively method, can be implemented in a motor control unit (MCU), in an on-chip motor controller, or in a dedicated motor controller, in particular in an electronically-commutated motor for automotive and non-automotive applications, e.g. for stepper motors and BLDG motors (BLDG=brushless direct current). The circuit 18 is designed for a least one of detecting a stall state of the electric motor 14 and of determining a speed of the electric motor 14.

According to a third aspect a method for speed monitoring comprises following steps: generating a time-frame signal, which indicates when a time-frame of predefined length changes from an inactive state to an active state, and which indicates when the time-frame changes back from the active state to the inactive state; receiving a first signal $V_g$ from a chopper driver circuit 16 controlling the electric motor 14; detecting chopper pulses 103 in the first signal $V_g$; counting the detected chopper pulses 103 while the active state is indicated; and at least one of outputting and evaluating a count value, after the inactive state of the time-frame has been indicated.

According to a fourth aspect of the invention a method for speed monitoring of an electric motor 14 comprises following steps: receiving a second signal $V_u$ from a chopper driver circuit 16 driving the electric motor 14, wherein the second signal $V_u$ includes a value of a voltage $U_W$ applied to a winding 12 of the electric motor 14; determining a value $V_i$ of an electric current $I_w$ flowing through the winding 12; and determining a phase angle α between the voltage $U_W$ applied to the winding 12 and the electric current $I_w$ flowing through the winding 12.

The invention claimed is:

1. A circuit for speed monitoring of an electric motor, wherein the circuit comprises:
    a circuit for generating a time-frame signal, which indicates when a time-frame of predefined length changes from an inactive state to an active state, and which indicates when the time-frame changes back from the active state to the inactive state;
    a circuit for receiving a first signal from a chopper driver circuit designed to drive the electric motor;
    a circuit for detecting chopper pulses in the first signal;
    a pulse counter designed to count the detected chopper pulses while the active state is indicated by the circuit for generating the time-frame signal; and
    a circuit for at least one of outputting and evaluating a state of the pulse counter, after the inactive state of the time-frame has been indicated.

2. The circuit for speed monitoring according to claim 1, wherein the pulse counter is designed to be reset, when the time-frame signal indicates a change to the active state of the time-frame.

3. The circuit for speed monitoring according to claim 1, wherein the pulse counter is designed to stop a counting of the chopper pulses, when the time-frame signal indicates a change into the inactive state.

4. The circuit for speed monitoring according to claim 1, wherein the circuit for speed monitoring comprises a circuit for determining a frequency of the chopper pulses.

5. The circuit for speed monitoring according to claim 1, wherein the circuit for speed monitoring comprises a circuit for determining a length of a period of a chopper duty cycle of the chopper pulses.

6. The circuit for speed monitoring according to claim 1, wherein the circuit for speed monitoring comprises a circuit for determining a chopper duty rate of the chopper pulses.

7. The circuit according to claim 1, wherein the circuit is designed for a least one of detecting a stall state of the electric motor and determining a speed of the electric motor.

8. A method for speed monitoring of an electric motor, the method comprising following steps:
    generating a time-frame signal, which indicates when a time-frame of predefined length changes from an inactive state to an active state, and which indicates when the time-frame changes back from the active state to the inactive state;
    receiving a first signal from a chopper driver circuit controlling the electric motor;
    detecting chopper pulses in the first signal;
    counting the detected chopper pulses while the active state is indicated;
    at least one of outputting and evaluating a count value, after the inactive state of the time-frame has been indicated;
    receiving a second signal from a chopper driver circuit driving the electric motor, wherein the second signal includes a value of a voltage applied to a winding of the electric motor;

determining a value of an electric current flowing through the winding; and determining a phase angle between the voltage applied to the winding and the electric current flowing through the winding.

9. The method for speed monitoring according to claim 8, further comprising resetting the counting of the detected chopper pulses when the time-frame signal indicates a change to the active state of the time-frame.

10. The method for speed monitoring according to claim 8, further comprising stopping the counting of the detected chopper pulses when the time-frame signal indicates a change into the inactive state.

11. The method for speed monitoring according to claim 8, further comprising determining a frequency of the chopper pulses.

12. The method for speed monitoring according to claim 8, further comprising determining a length of a period of a chopper duty cycle of the chopper pulses.

13. The method for speed monitoring according to claim 8, further comprising determining a chopper duty rate of the chopper pulses.

14. The method according to claim 8, wherein the value of the voltage notified by the second signal is a value of a peak voltage and wherein the value of the current flowing through the winding is a value of a peak current.

15. The method according to claim 8, further comprising: a least one of detecting a stall state of the electric motor and determining a speed of the electric motor.

16. A system comprising:
an electric motor; and
a circuit for speed monitoring of the electric motor, wherein the circuit comprises:

a circuit for generating a time-frame signal, which indicates when a time-frame of predefined length changes from an inactive state to an active state, and which indicates when the time-frame changes back from the active state to the inactive state;

a circuit for receiving a first signal from a chopper driver circuit designed to drive the electric motor;

a circuit for detecting chopper pulses in the first signal;

a pulse counter designed to count the detected chopper pulses while the active state is indicated by the circuit for generating the time-frame signal; and a circuit for at least one of outputting and evaluating a state of the pulse counter, after the inactive state of the time-frame has been indicated.

17. The system according to claim 16, wherein the pulse counter is designed to be reset when the time-frame signal indicates a change to the active state of the time-frame.

18. The system according to claim 16, wherein the pulse counter is designed to stop a counting of the chopper pulses when the time-frame signal indicates a change into the inactive state.

19. The system according to claim 16, wherein the circuit for speed monitoring comprises a circuit for determining a frequency of the chopper pulses.

20. The system according to claim 16, wherein the circuit for speed monitoring comprises a circuit for determining a length of a period of a chopper duty cycle of the chopper pulses.

* * * * *